United States Patent
Umezaki et al.

[11] Patent Number: 5,616,410
[45] Date of Patent: Apr. 1, 1997

[54] MAGNETIC RECORDING MEDIUM

[75] Inventors: Hiroshi Umezaki; Yoshiaki Takeuchi; Shoji Sugimoto, all of Niihama, Japan

[73] Assignee: Sumitomo Chemical Company, Limited, Osaka, Japan

[21] Appl. No.: 355,230

[22] Filed: Dec. 9, 1994

Related U.S. Application Data

[63] Continuation of Ser. No. 805,935, Dec. 12, 1991, abandoned.

[30] Foreign Application Priority Data

Dec. 20, 1990 [JP] Japan ..................... 2-404439

[51] Int. Cl.$^6$ .................. G11B 5/66; B32B 5/16
[52] U.S. Cl. .................. 428/323; 428/328; 428/329; 428/330; 428/402; 428/403; 428/332; 428/336; 428/694 B; 428/694 BN; 428/694 BC; 428/694 ST; 428/694 SL; 428/900; 427/127; 427/128; 427/130
[58] Field of Search .................. 428/329, 330, 428/323, 328, 402, 403, 694 B, 694 BN, 694 BC, 694 ST, 694 SL, 332, 336, 900; 427/127, 128, 130

[56] References Cited

U.S. PATENT DOCUMENTS

| | | | |
|---|---|---|---|
| 4,741,952 | 5/1988 | Aoyama | 428/323 |
| 4,756,962 | 7/1988 | Takamatsu | 428/329 |
| 4,917,947 | 4/1990 | Koshe | 428/329 |
| 5,110,774 | 5/1992 | Ogura | 501/126 |
| 5,141,807 | 8/1992 | Umezaki | 428/329 |

FOREIGN PATENT DOCUMENTS 0208549  1/1987  European Pat. Off. .

OTHER PUBLICATIONS

Patent Abstracts of Japan vol. 12, No. 566 (P–976) 15 Dec., 1989 and JP–A–01 236 426 (Hitachi Maxell Ltd) 21 Sep. 1989, abstract only.

Patent Abstracts of Japan vol. 13, No. 353 (P–913) (3701) 8 Aug. 1989 and JP–A–01 112 523 (Hitachi Maxell Ltd) 1 May 1989, abstract only.

Patent Abstracts of Japan vol. 13, No. 85 (P–834) (3433) 27 February 1989 and JP–A–63 268 118 (Fuji Photo Film Co Ltd.) 4 Nov. 1988, abstract only.

*Primary Examiner*—Leszek Kiliman
*Attorney, Agent, or Firm*—Birch, Stewart, Kolasch & Birch, LLP

[57] ABSTRACT

The present invention provides a magnetic recording medium comprising, on a non-magnetic substrate, a magnetic layer containing magnetic fine powder and a binder, wherein the magnetic layer contains alumina powder having an average particle size of at most 1 µm and containing at least one oxide of element selected from the group consisting of Ge, P, Sn, Nb, Ta, Mo and W in an amount of 0.1 to 10 parts by weight per 100 parts by weight of alumina. The magnetic recording medium of the present invention has good durability and good abrasion resistance of the magnetic layer, and good magnetic characteristics, good surface smoothness and a good cleaning effect on a magnetic head.

23 Claims, No Drawings

MAGNETIC RECORDING MEDIUM

This application is a continuation of application Ser. No. 07/805,935 filed on Dec. 12, 1991, now abandoned.

BACKGROUND OF THE INVENTION

1. Field of the Invention

The present invention relates to a magnetic recording medium. In particular, it relates to a magnetic recording medium a magnetic layer of which has good durability, good abrasion resistance, good magnetic characteristics and good surface smoothness, and also a good cleaning effect on a magnetic head.

2. Description of the Related Art

A magnetic recording medium such as a magnetic tape, a magnetic disk and a magnetic sheet is widely used in audios, videos and computers.

The magnetic recording medium may have a magnetic layer which contains, as a reinforcing agent or an abrasive material, non-magnetic powder such as $Al_2O_3$, $Cr_2O_3$, SiC and $\alpha$-$Fe_2O_3$ so as to improve the durability and the abrasive resistance of the magnetic layer and to clean deposits on a magnetic head.

However, when the non-magnetic powder is added, the magnetic recording medium suffers from decrease of magnetic characteristics due to the decreased packing density of the magnetic powder and deterioration of electromagnetic transformation characteristic due to the poor surface smoothness of the magnetic layer although the durability and the abrasive resistance are improved. In addition, it suffers from clogging of the magnetic head and increase of the noise since the non-magnetic powder partially drops during a tape traveling and the traveling durability is gradually deteriorated.

Recently, increase of a magnetic recording density is intended by using metal magnetic powder or fine iron oxide magnetic powder. It has been desired to improve the surface smoothness and the electromagnetic transformation characteristic of the magnetic recording medium, and the abrasive resistance and the traveling durability of the magnetic layer. However, when the conventional non-magnetic powder is used, the above defects are increased.

It is known to add a dispersing agent such as a phosphate ester, a fatty acid and various surfactants in a step of dispersing the non-magnetic powder in a magnetic paint so as to improve the dispersibility of the non-magnetic powder. However, when such dispersing agent is added, a so-called blooming phenomenon undesirably arises, namely the dispersing agent exudes on a surface of the magnetic layer.

In addition, it is proposed to use the non-magnetic powder which is treated with a coupling agent such as a silane coupling agent and a titanium coupling agent so as to improve the reinforcing effect on the magnetic layer and the dispersibility of the non-magnetic powder. However, the reinforcing effect and dispersibility are not satisfactory since the coupling agent is easily separated from the non-magnetic powder under mixing and dispersing conditions at high shear during the preparation of a magnetic paint.

In addition, it is proposed to improve the magnetic characteristics, the surface roughness, the abrasive resistance and the durability of the magnetic layer by increasing a surface acidity of the non-magnetic powder.

Namely, there is known a magnetic recording medium characterized in that inorganic powder particles are present in a high ratio in the vicinity of the magnetic layer surface since the inorganic powder particles having a Mohs hardness of at least 5 repulses a binder by coating surfaces of the inorganic powder particles with an acidic material or an acidic oxide material so as to increase an acidity (U.S. Pat. No. 4,917,947). There is also known a magnetic recording medium having a magnetic layer which contains magnetic powder and inorganic powder having a Mohs hardness of at least 6, an average particle size of at most 1 µm and pH of less than 7 through coating of an acidic material (Japanese Patent Kokai Publication No. 201822/1989).

However these magnetic recording media provide unsatisfactory effects. Since the surface hardness of the inorganic powder is deteriorated because of the coating material for acidification and the abrasion strength is decreased, the sufficient head cleaning effect cannot be obtained. The coating material for acidification tends to be separated from the inorganic powder during the preparation of the magnetic paint.

SUMMARY OF THE INVENTION

An object of the present invention is to provide a recording medium having good magnetic characteristics and good surface smoothness simultaneously with having good durability, good abrasive resistance and a good cleaning effect on a magnetic head.

This and other objects are achieved by a magnetic recording medium comprising, on a non-magnetic substrate, a magnetic layer containing magnetic fine powder and a binder, wherein the magnetic layer contains alumina powder having an average particle size of at most 1 µm and containing at least one oxide of element selected from the group consisting of Ge, P, Sn, Nb, Ta, Mo and W in an amount of 0.1 to 10 parts by weight per 100 parts by weight of alumina, and the oxide-containing alumina powder is in a state in which said oxide in the alumina powder is in a solid solution form in the $Al_2O_3$ crystal, or a state in which said oxide or a double oxide consisting of said oxide and $Al_2O_3$ is dispersed and crystallized in the $Al_2O_3$ crystal.

DETAILED DESCRIPTION OF THE INVENTION

The alumina powder is obtainable by one of the following methods:

(1) a method comprising mixing a component which forms at least one oxide of element selected from the group consisting of Ge, P, Sn, Nb, Ta, Mo and W after calcination with a solution containing an aluminum salt homogeneously, recovering an aluminum compound by a neutralization process, a recrystallization process or a process in which a carbonate salt is precipitated through the addition of a carbonic acid-containing material, and calcining the aluminum compound, (2) a method comprising mixing a component which forms at least one oxide of element selected from the group consisting of Ge, P, Sn, Nb, Ta, Mo and W after calcination with a solution containing an organic aluminum compound homogeneously, recovering an aluminum compound by hydrolysis, and calcining the aluminum compound, and (3) a method comprising dry or wet mixing at least one oxide of metal selected from the group consisting of Ge, P, Sn, Nb, Ta, Mo and W or a compound of said metal which forms said metal oxide after calcination with an aluminum compound prepared by a neutralization process, a recrystallization process, a process in which a carbonate salt is precipitated through the addition of ammonium hydrogencarbonate and the like from an aluminum salt, or an aluminum compound prepared by hydrolysis or pyrolysis of an organic aluminum compound, and calcining the mixture.

$Al_2O_3$ powder used in the present invention has an average particle size of at most about 1 μm and contains at least one oxide of element selected from the group of germanium (Ge), phosphorus (P), tin (Sn), niobium (Nb), tantalum (Ta), molybdenum (Mo) and tungsten (W) in an amount of about 0.1 to about 10 parts by weight, preferably about 0.5 to about 8 parts by weight per 100 parts by weight of $Al_2O_3$. The lower limit of the average particle size is preferably about 0.05 μm, more preferably about 0.08 μm.

The term "oxide-containing $Al_2O_3$ powder" means a state in which said oxide in the $Al_2O_3$ powder is in a solid solution form in the $Al_2O_3$ crystal, or a state in which said oxide or a double oxide consisting of said oxide and $Al_2O_3$ is dispersed and crystallized in the $Al_2O_3$ crystal. It does not include a mere mixture of the $Al_2O_3$ powder and said oxide powder, and $Al_2O_3$ powder a surface of which is coated with said oxide.

When the powder prepared by coating particle surfaces of $Al_2O_3$ powder with said oxide is used, the abrasion effect is low and a sufficient head cleaning effect cannot be obtained since a surface hardness of $Al_2O_3$ powder may be deteriorated. When a mere mixture is used, it is impossible to obtain effects better than the effects achieved by each material, namely it is impossible to obtain a magnetic recording medium having the good electromagnetic transformation characteristic, the good traveling durability and the good abrasive resistance of the magnetic layer, and the good cleaning effect on a magnetic head.

A method for preparing $Al_2O_3$ powder which contains said oxide is not limited insofar as at least one oxide of element selected from the group consisting of Ge, P, Sn, Nb, Ta, Mo and W is contained in the form of a solid solution in the $Al_2O_3$ crystal, or present in a state in which said oxide or a double oxide consisting of said oxide and $Al_2O_3$ is dispersed and crystallized in the $Al_2O_3$ crystal. For example, is mentioned a method wherein a component forming said oxide after calcination is homogeneously mixed with a solution containing an aluminum halide such as aluminum chloride or an aluminum salt such as aluminum sulfate, aluminum nitrate, aluminum perchlorate and ammonium alum, then an aluminum compound is recovered by a neutralization process, a recrystallization process or a process in which a carbonate salt is precipitated through the addition of ammonium hydrogencarbonate, and the aluminum compound is calcined.

Also is mentioned a method wherein a component forming said oxide after calcination is homogeneously mixed with a solution containing an organic aluminum compound, then an aluminum compound is recovered by hydrolysis, and the aluminum compound is calcined. Specific examples of the organic aluminum compound are an aluminum alkoxide such as aluminum methoxide, aluminum ethoxide, aluminum isopropoxide and aluminum butoxide, and an alkyl aluminum such as trimethyl aluminum and triethyl aluminum, and an aluminum carboxylate salt and an aluminum dicarboxylate salt.

Further is mentioned a method wherein at least one oxide of metal selected from the group consisting of Ge, P, Sn, Nb, Ta, Mo and W or a compound of said metal which forms said metal oxide after calcination is dry or wet mixed with an aluminum compound prepared by a neutralization process, a recrystallization process,-a process in which a carbonate salt is deposited through addition of ammonium hydrogencarbonate and the like from an aluminum salt only, or an aluminum compound prepared by hydrolysis or pyrolysis of an organic aluminum compound only, and then the mixture is calcined.

In each method, the calcination may be conducted at a temperature of about 1100° to about 1400° C. for about 1 to about 4 hours.

The component of said oxide to be mixed may be an oxide in the final state. It is possible to use, as the component, a solution containing said element, a fine particle metal, a fine particle metal hydroxide, a fine particle metal oxide and the like.

Specific examples of the component which forms said oxide after the calcination are a fine particle metal; a tungsten compound containing element W, for example, tungstic acid, an ammonium salt of tungstic acid such as ammonium metatungstate and ammonium paratungstate, a tungsten halide such as tungsten chloride, and a tungsten oxyhalide such as tungsten oxychloride;

a molybdenum compound containing element Mo, for example, molybdic acid, molybdenum oxide, molybdenum hydroxide, ammonium molybdate and a molybdenum halide such as molybdenum chloride;

a niobium compound containing element Nb, for example, niobium hydroxide, a niobium-alkoxide such as niobium methoxide, niobium ethoxide and niobium propoxide, a niobium halide such as niobium chloride, and a niobium oxyhalide such as niobium oxychloride;

tantalum compound containing element Ta, for example, tantalum hydroxide, a tantalum alkoxide such as tantalum methoxide, tantalum ethoxide and tantalum isopropoxide, an a tantalum halide such as tantalum chloride;

a germanium compound containing element Ge, for example, germanium alkoxide such as germanium ethoxide, germanium isopropoxide and germanium n-butoxide, and a germanium halide such as germanium chloride;

a tin compound containing element Sn, for example, stannic acid, tin hydroxide, a tin alkoxide such as tin ethoxide tin isopropoxide, a tin halide such as tin chloride, and sulfate; and a phosphorus compound containing element P, for example, phosphoric acid compound such as orthophosphoric acid, metaphosphoric acid, trimetaphosphoric acid, phosphorous acid, phosphinous acid, pyrophosphoric acid, tripolyphosphoric acid, tetrapolyphosphoric acid and pyrophosphinic acid, a phosphorus halide such as phosphorus trichloride and phosphorus pentachloride, a phosphate ester such as trimethyl phosphate, triethyl phosphate, monoethyl phosphate, dimethyl phosphate and diethyl phosphate, and an ammonium salt such as ammonium phosphate and ammonium hydrogenphosphate.

When the content of said oxide in $Al_2O_3$ powder is smaller than 0.1 parts by weight, the durability is not sufficient probably since the active sites having an affinity with the binder are decreased. When the content is larger than 10 parts by weight, the hardness of $Al_2O_3$ is undesirably low.

An average particle size of $Al_2O_3$ powder is not larger than about 1 μm, preferably about 0.8 μm or less. When the average particle size is larger than 1 μm, the surface smoothness and the magnetic characteristics are undesirably low.

The alumina powder containing said oxide is added to the magnetic powder in an amount of about 0.1 to about 15% by weight, preferably about 0.5 to about 10% by weight based on the magnetic powder.. When the addition amount is smaller than about 0.1% by weight, the durability and the abrasive resistance of the magnetic layer are poor. When it is larger than about 15% by weight, the magnetic characteristics and the surface smoothness are poor and the abrasion of a magnetic head is undesirably high.

The magnetic powder used according to the present invention may be any one of conventionally used magnetic materials. Specific examples are oxide magnetic materials such as $\gamma\text{-Fe}_2\text{O}_3$, Co-containing $\gamma\text{-Fe}_2\text{O}_3$, Co-coated $\gamma\text{-Fe}_2\text{O}_3$, $\text{Fe}_3\text{O}_4$, Co-containing $\text{Fe}_3\text{O}_4$, Co-coated $\text{Fe}_3\text{O}_4$ and $\text{CrO}_2$, and metal magnetic materials such as Fe, Ni, Co, Fe—Ni alloy, Fe—Co alloy, Fe—Ni—P alloy, Fe—Ni—Co alloy, Fe—Mn—Zn alloy, Fe—Ni—Zn alloy, Fe—Co—Ni—Cr alloy, Fe—Co—Ni—P alloy, Co—Ni alloy, Co—P alloy, Co—Cr alloy and metal magnetic powder based on Fe, Ni or Co.

A particle size (an average primary particle size) of the magnetic powder is not particularly limited. It is generally from about 0.05 to about 5 µm.

An additive for the metal magnetic material may contain an element such as Si, Cu, Zn, Al, P, Mn and Cr or a compound comprising said element in a conventional amount.

Hexagonal system ferrite such as barium ferrite, iron nitride and iron carbide can be contained.

The binder used for the magnetic layer according to the present invention may be any of known binders used for a magnetic recording medium, for example, a thermoplastic resin, a thermosetting resin, a reactive resin, an electron beam irradiation curing resin and a mixture thereof.

Specific examples of the binder are a urethane resin, an epoxy resin, a urea resin, an amide resin, a silicone resin, a polyester resin, a phenol resin, a vinyl resin, a cellulose derivative resin and a rubbery resin, a copolymer of these resins and a mixture thereof. An amount of the binder is preferably from about 10 to about 40 parts by weight per 100 parts by weight of the magnetic powder.

Specific examples of the non-magnetic substrate are polyesters such as polyethylene terephthalate and polyethylene naphthalate, polyolefins such as polypropylene, cellulose derivatives such as cellulose triacetate and cellulose diacetate, vinyl resins such as polyvinyl chloride, and plastic materials such as polycarbonate, polyamide and polysulfone. Additional examples are metals such as copper, and ceramics such as glass and alumina.

The magnetic recording medium according to the present invention can be prepared by conventional procedures which are not particularly limited. For example, the magnetic recording medium can be prepared by mixing and dispersing the magnetic powder, the binder and oxide-containing alumina together with various additives in the presence of an organic solvent to prepare a magnetic paint, and then coating and drying the magnetic paint on the non-magnetic substrate, if necessary, followed by a thermal treatment and/or a surface treatment. A thickness of the magnetic layer is preferably from about 0.1 to about 10 µm.

The present invention provides the magnetic recording medium in which the durability, the abrasive resistance and the surface smoothness of the magnetic layer are excellent and the cleaning effect on the magnetic head is excellent because of a simple procedure in which alumina powder containing the specific oxide is used instead of conventionally used non-magnetic powder such as alumina powder.

PREFERRED EMBODIMENTS OF THE INVENTION

The present invention is illustrated by the following Examples, by which the present invention is not limited.

Physical properties are measured as follows:
Squareness ratio:

A squareness ratio is measured at a sweep magnetic field of 15K Gauss by a vibratory flux meter (BHV-50 manufactured by Riken Denshi).
Surface gloss:

Total reflectance at an incident angle of 60° and a reflective angle of 60° in a longitudinal direction of a sample tape is measured by means of a standard gloss meter, and a relative value thereof is determined by setting a specular glossiness to 100 at an incident angle of 60° in a glass having a refractive index of 1.56 according JIS-Z 8741.
Still characteristic:

Using a video deck modified for still measurement, a 4 MHz signal is recorded in a sample tape. When the signal is reproduced in the still state at 25° C. and 60% RH under a back tension of 40 g, a time required for decreasing, a reproducing output to a half value is measured.
Head deposition and head abrasion amounts:

When a sample tape is traveled for 100 hours at 40° C. and 80% RH using a video deck NV-G21 manufactured by Matsushita, a deposit state on a magnetic head is observed and an abrasion amount of the head is measured.
Average particle size:

When the average particle size is smaller than 0.3 µm, particle sizes (averages of major axis and minor axis) are read from a scanning electron microscope photograph to prepare a cumulative frequency distribution curve, and then the center particle size of the curve is regarded as the average particle size. When the average particle size is not smaller than 0.3 µm, it is measured by a centrifugal sedimentation particle size distribution measuring instrument (Shimazu CP-50).

EXAMPLE 1

A large excess amount of water was added to a solution of aluminum isopropoxide in isopropyl alcohol to conduct hydrolysis, and ammonium tungstate was added and homogeneously mixed. Then, the solvent was evaporated off and the residue was calcined at 1270° C. for 3 hours to obtain alumina powder containing $WO_3$ in an amount of 1.0 part by weight and having an average primary particle size of 0.2 µm. Using 5 parts by weight of this alumina powder, a magnetic paint of the following composition was prepared:

| | |
|---|---|
| Co-coated $\gamma\text{-Fe}_2\text{O}_3$ | 100 parts by weight |
| (B-42 manufactured by Titanium Kogyo Kabushiki Kaisha) | |
| BET specific surface area: 43 m²/g | |
| Hc: 690 Oe | |
| $\sigma_s$: 72 emu/g | |
| Major axis: 0.25 µm | |
| Minor axis: 0.05 µm | |
| Polyurethane resin | 10 parts by weight |
| (SB-0853 manufactured by Sumitomo Bayer Urethane Kabushiki Kaisha) | |
| Vinyl chloride/vinyl acetate/vinyl alcohol copolymer (MPR-TA5C manufactured by Nisshin Kagaku Kabushiki Kaisha) | 10 parts by weight |
| Carbon black | 2 parts by weight |
| (Vulcan ® XC-72 manufactured by Cabot) | |
| Butyl stearate | 1 parts by weight |

-continued

| | |
|---|---|
| Methyl ethyl ketone | 100 parts by weight |
| Toluene | 100 parts by weight |
| Cyclohexanone | 50 parts by weight |
| Polyisocyanate curing agent (Sumidur ® L manufactured by Sumitomo Bayer Urethane Kabushiki Kaisha) | 2 parts by weight |

After the above composition was dispersed for 5 hours with a sand mill and filtered through a filter having an average pore size of 1 µm, it was coated on a polyethylene terephthalate film having a thickness of 10 µm and dried to form a dried magnetic layer having a thickness of 3 µm. After calendering, the film was cured at 70° C. for 24 hours. Then, the film was cut in a width of ½ inch to prepare a magnetic tape. The surface gloss of the magnetic tape, the still characteristic, the deposit amount on the head, and the head abrasion amount were measured. The results are shown in Table 1.

EXAMPLES 2 TO 8 AND COMPARATIVE EXAMPLES 1 TO 4

Magnetic tapes were prepared in the same manner as in Example 1, except using alumina powder which had the properties shown in Table 1 and was prepared by using an additive and a calcination temperature shown in Table 2 during the alumina powder preparation. The surface gloss of the magnetic tape, the still characteristic, the deposit amount on the head, and the head abrasion amount were measured. The results are shown in Table 1.

EXAMPLE 9

A magnetic tape was prepared in the same manner as in Example 1, except using alumina powder which had properties shown in Table 1 and was prepared by adding ammonium tungstate to an aqueous solution of ammonium alum and precipitating ammonium alum containing tungsten by recrystallization and calcined it in the condition shown in Table 2. The surface gloss of the magnetic tape, the still characteristic, the deposit amount on the head, and the head abrasion amount were measured. The results are shown in Table 1.

EXAMPLE 10

Triethyl phosphate was added to and homogeneously mixed with a solution of aluminum isopropoxide in isopropyl alcohol. Then, a large excess amount of water was added to conduct hydrolysis, and the solvent was evaporated off. The residue was calcined at 1280° C. for 3 hours to obtain alumina powder having an average particle size of 0.23 µm and containing $P_2O_5$ in an amount of 0.8 parts by weight. A magnetic tape was prepared in the same manner as in Example 1. The surface gloss of the magnetic tape, the still characteristic, the deposit amount on the head, and the head abrasion amount were measured. The results are shown in Table 1.

COMPARATIVE EXAMPLE 5

High purity alumina having an average particle size of 0.2 µm (AKP-50 manufactured by Sumitomo Chemical Company, Ltd.) was dispersed in water. Ammonium tungstate was added and fully mixed, and then the mixture was dried and calcined at 800° for 3 hours to obtain alumina powder coated with $WO_3$ in an amount of 1.0 parts by weight.

A magnetic tape was prepared in the same manner as in Example 1 except that the resultant alumina powder coated with $WO_3$ (average particle size: 0.2 µm) was used. The results are shown in Table 1.

TABLE 1

| | Properties of $Al_2O_3$ powder | | | Properties of tape | | | | |
|---|---|---|---|---|---|---|---|---|
| Example No. | Type of oxide | Amount (parts by weight) | Average particle size (µm) | Squareness ratio (%) | Surface gloss | Still characteristic (min.) | Deposit on head | Head abrasion (µm/100 h) |
| 1 | $WO_3$ | 1.0 | 0.2 | 0.81 | 138 | >90 | Good | 4 |
| 2 | $WO_3$ | 6.0 | 0.2 | 0.81 | 138 | >90 | Good | 4 |
| 3 | $MoO_3$ | 1.0 | 0.7 | 0.80 | 136 | >90 | Good | 5 |
| 4 | $Nb_2O_5$ | 3.0 | 0.4 | 0.81 | 138 | >90 | Good | 4 |
| 5 | $Ta_2O_5$ | 3.0 | 0.2 | 0.82 | 140 | >90 | Good | 3 |
| 6 | $GeO_2$ | 6.0 | 0.4 | 0.80 | 137 | >90 | Good | 3 |
| 7 | $SnO_2$ | 6.0 | 0.2 | 0.80 | 140 | >90 | Good | 4 |
| 8 | $P_2O_5$ | 0.8 | 0.2 | 0.81 | 138 | >90 | Good | 3 |
| 9 | $WO_3$ | 1.0 | 0.2 | 0.82 | 139 | >90 | Good | 3 |
| 10 | $P_2O_5$ | 0.8 | 0.2 | 0.80 | 136 | >90 | Good | 5 |
| Comp. 1 | — | — | 0.4 | 0.78 | 132 | 30 | Bad | 3 |
| Comp. 2 | $WO_3$ | 1.0 | 1.2 | 0.77 | 130 | 70 | Good | 25 |
| Comp. 3 | $WO_3$ | 1.2 | 0.4 | 0.80 | 136 | 60 | Bad | 2 |
| Comp. 4 | $WO_3$ | 0.05 | 0.4 | 0.79 | 132 | 30 | Fair | 6 |
| Comp. 5 | $WO_3$ | 1.0 (coating) | 0.2 | 0.79 | 132 | 40 | Bad | 2 |

| Example No. | Type of additive | Calcination temperature (°C.) |
|---|---|---|
| 2 | Ammonium tungstate | 1300 |
| 3 | Ammonium molybdate | 1250 |
| 4 | Niobium ethoxide | 1220 |
| 5 | Tantalum ethoxide | 1200 |
| 6 | Germanium isopropoxide | 1220 |
| 7 | Tin sulfate | 1200 |
| 8 | Orthophosphoric acid | 1280 |
| 9 | Ammonium tungstate | 1270 |
| 10 | Triethyl phosphate | 1280 |
| Comp. 1 | — | |
| Comp. 2 | Ammonium tungstate | 1400 |
| Comp. 3 | ↑ | 1300 |
| Comp. 4 | ↑ | 1250 |

What is claimed is:

1. A magnetic recording medium comprising:

a non-magnetic substrate, and a magnetic layer disposed on said substrate, said magnetic layer containing magnetic fine powder, a binder, and oxide-containing alumina powder, wherein the oxide-containing alumina powder has an average particle size of at most 1 µm and contains at least one oxide of an element selected from the group consisting Ge, P, Sn, Nb, Ta, Mo and W in an amount of 0.1 to 10 parts by weight per 100 parts by weight of alumina, and the oxide-containing alumina powder is in a state in which said oxide in the alumina powder is in a solid solution form in the alumina crystal, or a state in which said oxide or a double oxide consisting of said oxide and alumina is dispersed and crystallized in the alumina crystal, wherein said alumina powder is obtained by one of the following methods (A), (B) or (C):

(A) mixing a component which forms at least one oxide of an element selected from the group consisting of Ge, P, Sn, Nb, Ta, Mo and W after calcination with a solution containing an aluminum salt homogeneously; recovering an aluminum compound by a neutralization process, a recrystallization process or a process in which a carbonate salt is precipitated through the addition of a carbonic acid-containing material; and calcining the aluminum compound at a temperature of about 1100° to 1400° C.

(B) mixing a component which forms at least one oxide of an element selected from the group consisting of Ge, P, Sn, Nb, Ta, Mo and W after calcination with a solution containing an organic aluminum compound homogeneously, recovering an aluminum compound by hydrolysis, and calcining the aluminum compound at a temperature of about 1100° to 1400° C.; or (C) dry or wet mixing at least one oxide of metal selected from the group consisting of Ge, P, Sn, Nb, Ta, Mo and W or a compound of said metal which forms the metal oxide after calcination with an aluminum compound prepared by a neutralization process, a recrystallization process, a process in which a carbonate salt is precipitated through the addition of ammonium hydrogencarbonate from an aluminum salt, or an aluminum compound prepared by hydrolysis or pyrolysis of an organic aluminum compound; and calcining the mixture at a temperature of about 1100° to 1400° C.

2. The magnetic recording medium according to claim 1, wherein the magnetic layer contains the oxide-containing alumina powder in an amount of about 0.1 to about 15% by weight based on the magnetic powder.

3. The magnetic recording medium according to claim 1, wherein the oxide-containing alumina powder contains said oxide in an amount of about 0.5 to 8 parts by weight per 100 parts by weight of alumina.

4. The magnetic recording medium according to claim 1, the oxide-containing alumina powder has an average particle size of at most 0.05 µm.

5. The magnetic recording medium according to claim 1, the oxide-containing alumina powder has an average particle size of at most 0.08 µm.

6. The magnetic recording medium according to claim 1, wherein the magnetic layer contains the alumina powder in an amount of about 0.5 to about 10% by weight based on the magnetic powder.

7. The magnetic recording medium according to claim 1, wherein the magnetic powder has an average primary particle size of from about 0.05 to about 5 µm.

8. The magnetic recording medium according to claim 1, wherein the magnetic powder contains as an additive an element selected from the group consisting of Si, Cu, Zn, Al, P, Mn and Cr.

9. The magnetic recording medium according to claim 1, wherein the binder is present in an amount from about 10 to about 40 parts by weight per 100 parts by weight of the magnetic powder.

10. The magnetic recording medium according to claim 1, wherein the non-magnetic substrate is a member selected from the group consisting of polyesters, cellulose derivatives, vinyl resins and plastic materials.

11. The magnetic recording medium according to claim 1, wherein the non-magnetic substrate is a member selected from the group consisting of polyethylene terephthalate, polyethylene naphthalate, polypropylene, cellulose triacetate, cellulose diacetate, polyvinyl chloride, polycarbonate, polyamide and polysulfone.

12. The magnetic recording medium according to claim 1, wherein the non-magnetic substrate is a member selected from the group consisting of metals and ceramics.

13. The magnetic recording medium according to claim 1, wherein the non-magnetic substrate is a member selected from the group consisting of copper, glass and alumina.

14. The magnetic recording medium according to claim 1, wherein the thickness of the magnetic layer is from about 0.1 to about 10 µm.

15. The magnetic recording medium according to claim 1, wherein the oxide-containing alumina powder contains an oxide of Ge.

16. The magnetic recording medium according to claim 1, wherein the oxide-containing alumina powder contains an oxide of P.

17. The magnetic recording medium according to claim 1, wherein the oxide-containing alumina powder contains an oxide of Ta.

18. The magnetic recording medium according to claim 1, wherein the oxide-containing alumina powder contains an oxide of Sn.

19. The magnetic recording medium according to claim 1, wherein the oxide-containing alumina powder contains an oxide of Nb.

20. The magnetic recording medium according to claim 1, wherein the oxide-containing alumina powder contains an oxide of Mo.

21. The magnetic recording medium according to claim 1, wherein the oxide-containing alumina powder contains an oxide of W.

22. A magnetic recording medium comprising:

a non-magnetic substrate; and a magnetic layer disposed on said substrate, said magnetic layer containing magnetic fine powder, a binder, an oxide-containing alumina powder, wherein the oxide-containing alumina powder has an average particle size of between 0.05 and 1 µm and contains at least one oxide of an element selected from the group consisting of Ge, P, Sn, Nb, Ta, Mo and W in an amount of about 0.5 to about 8 parts by weight per 100 parts by weight of alumina, and the oxide-containing alumina powder is in a state in which said oxide in the alumina powder is in a solid solution form in the alumina crystal, or a state in which said oxide or a double oxide consisting of said oxide and alumina is dispersed and crystallized in the alumina crystal, and wherein the oxide-containing alumina powder is present in an amount of about 0.1 to about 15% by weight based on the magnetic powder, wherein said alumina powder is obtainable by one of the following methods (A), (B) or (C):

(A) mixing a component which forms at least one oxide of an element selected from the group consisting of Ge, P, Sn, Nb, Ta, Mo and W after calcination with a solution containing an aluminum salt homogeneously; recovering an aluminum compound by a neutralization process, a recrystallization process or a process in which a carbonate salt is precipitated through the addition of a carbonic acid-containing materials and calcining the aluminum compounds;

(B) mixing a component which forms at least one oxide of an element selected from the group consisting of Ge, P, Sn, Nb, Ta, Mo and W after calcination with a solution containing an organic aluminum compound homogeneously, recovering an aluminum compound hydrolysis, and calcining the aluminum compound; or (C) dry or wet mixing at least one oxide of metal selected from the group consisting of Ge, P, Sn, Nb, Ta, Mo and W or a compound of said metal which forms the metal oxide after calcination with an aluminum compound prepared by a neutralization process, a recrystallization process, a process in which a carbonate salt is precipitated through the addition of ammonium hydrogencarbonate from an aluminum salt, or an aluminum compound prepared by hydrolysis or pyrolysis of an organic aluminum compound; and calcining the mixture.

23. A method for preparing a magnetic recording medium comprising:

disposing a magnetic layer on a non-magnetic substrate, said magnetic layer containing magnetic fine powder, a binder, and oxide-containing alumina powder, wherein the oxide-containing alumina powder has an average particle size of at most 1 μm and contains at least one oxide of an element selected from the group consisting of Ge, P, Sn, Nb, Ta, Mo and w in an amount of 0.1 to 10 parts by weight per 100 parts by weight of alumina, and the oxide-containing alumina powder is in a state in which said oxide in the alumina powder is in a solid solution form in the alumina crystal, or a state in which said oxide or a double oxide consisting of said oxide and alumina is dispersed and crystallized in the alumina crystal, wherein said alumina powder is obtained by one of the following methods (A), (B) or (C):

(A) mixing a component which forms at least one oxide of an element selected from the group consisting of Ge, P, Sn, Nb, Ta, Mo and W after calcination with a solution containing an aluminum salt homogeneously; recovering an aluminum compound by a neutralization process, a recrystalltzation process or a process in which a carbonate salt is precipitated through the addition of a carbonic acid-containing material; and calcining the aluminum compound at a temperature of about 1100° to 1400° C.;

(B) mixing a component which forms at least one oxide of an element selected from the group consisting of Ge, P, Sn, Nb, Ta, Mo and W after calcination with a solution containing an organic aluminum compound homogeneously recovering an aluminum compound by hydrolysis, and calcining the aluminum compound an a temperature of about 1100° to 1400° C.; or (C) dry or wet mixing at least one oxide of metal selected from the group consisting of Ge, P, Sn, Nb, Ta, Mo and W or a compound of said metal which forms the metal oxide after calcination with an aluminum compound prepared by a neutralization process, a recrystallization process, a process in which a carbonate salt is precipitated through the addition of ammonium hydrogencarbonate from an aluminum salt, or an aluminum compound prepared by hydrolysis or pyrolysis of an organic aluminum compound; and calcining the mixture at a temperature of about 1100° to 1400° C.

* * * * *